United States Patent
Zhang et al.

(10) Patent No.: US 9,015,819 B2
(45) Date of Patent: Apr. 21, 2015

(54) METHOD AND SYSTEM FOR SINGLE SIGN-ON

(75) Inventors: Mengwang Zhang, Shenzhen (CN); Tian Tian, Shenzhen (CN); Yinxing Wei, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 211 days.

(21) Appl. No.: 13/259,161

(22) PCT Filed: Mar. 24, 2011

(86) PCT No.: PCT/CN2011/072124
§ 371 (c)(1),
(2), (4) Date: Aug. 16, 2012

(87) PCT Pub. No.: WO2012/058896
PCT Pub. Date: May 10, 2012

(65) Prior Publication Data
US 2012/0311330 A1 Dec. 6, 2012

(30) Foreign Application Priority Data

Nov. 4, 2010 (CN) .......................... 2010 1 0532908

(51) Int. Cl.
*H04L 9/32* (2006.01)
*H04L 9/28* (2006.01)
(Continued)

(52) U.S. Cl.
CPC ........... *H04L 63/0815* (2013.01); *H04W 12/06* (2013.01); *G06F 21/41* (2013.01); *H04L 65/1016* (2013.01); *H04L 65/1063* (2013.01); *H04L 65/1006* (2013.01)

(58) Field of Classification Search
CPC .............. H04L 63/0815; H04L 63/062; H04L 29/06721; H04L 9/083; H04L 9/321
See application file for complete search history.

(56) References Cited

U.S. PATENT DOCUMENTS 7,174,383 B1  2/2007  Biswas et al.
2003/0172269 A1*  9/2003  Newcombe .................... 713/168
(Continued)

FOREIGN PATENT DOCUMENTS

CN      1859093 A     11/2006
CN    101552673 A     10/2009
(Continued)

OTHER PUBLICATIONS

International Search Report for International Application No. PCT/CN2011/072124, completed Jul. 28, 2011, mailed Aug. 18, 2011 (4 pages).

*Primary Examiner* — Matthew Henning
(74) *Attorney, Agent, or Firm* — Clark & Elbing LLP

(57) ABSTRACT

A method and a system for single sign-on are provided by the present invention, wherein the method comprises: a terminal sending an authentication request carrying a user identity identification to an RP and the RP redirecting the authentication request to an authentication center; the authentication center authenticating the terminal by means of SIP Digest and redirecting the authentication result to the RP via the terminal; and the RP providing services for the terminal according to an authentication result. By the present invention, the resources required by the operators to deploy GBAs are reduced, at the same time the requirement of non-UICC terminals accessing IMS network can be met, and the relevant application services of the IMS network can be accessed by means of SSO.

10 Claims, 3 Drawing Sheets

(51) Int. Cl.
  *G06F 21/00* (2013.01)
  *H04L 29/06* (2006.01)
  *H04W 12/06* (2009.01)
  *G06F 21/41* (2013.01)

(56) References Cited

U.S. PATENT DOCUMENTS

2008/0045214 A1    2/2008   Wen et al.
2008/0060055 A1*   3/2008   Lau .................................. 726/3
2008/0178004 A1*   7/2008   Wei et al. ..................... 713/171
2010/0262703 A1*  10/2010   Faynberg et al. ............. 709/229
2011/0258447 A1*  10/2011   Wei et al. ..................... 713/168

FOREIGN PATENT DOCUMENTS

| | | |
|---|---|---|
| CN | 101656608 A | 2/2010 |
| JP | 2004355073 A | 12/2004 |

* cited by examiner

METHOD AND SYSTEM FOR SINGLE SIGN-ON

FIELD OF THE INVENTION

The present invention relates to the communication field, and in particular to a method and a system for single sign-on.

BACKGROUND OF THE INVENTION

There are three scenarios during the process of User Equipment (abbreviated as UE) authentication and the process of achieving Single Sign-on (abbreviated as SSO) of a uniform IP Multimedia Subsystem (abbreviated as IMS), wherein the three scenarios are as follows.

1. The case that there is a Universal Integrated Circuit Card (abbreviated as UICC) in the IMS UE and the network operators have already deployed a General Bootstrapping Architecture (abbreviated as GBA): at this moment the single sign-on and the interconnection with other SSO mechanism can be achieved by using the combination of the GBA and Liberty Alliance/Open Identity Identification (OpenID). Under this scenario, in order to achieve the SSO, the operators will deploy a large amount of GBAs, and at the same time embed a UICC in each IMS UE and use the information in the GBAs and the UICCs to complete the SSO function of an IMS terminal accessing an application server.

2. The case that there is a UICC in the IMS UE but the operators cannot deploy the GBA: in this case the UE terminal user needs to be authenticated and when the SSO function of this IMS terminal accessing the AS application server is achieved, the combined solution of authentication and Key Agreement (abbreviated as AKA)/OpenID is often used, which is in particular as follows.

The IMS UE sends an authentication request to the Application Server (abbreviated as AS, also referred to as RP), wherein the request comprises an OpenID identifier; the RP uses this OpenID identifier to find the final Uniform/Universal Resources Locater (abbreviated as URL) of an OpenID Provider (abbreviated as OP) and redirects the user authentication request to this URL; the OP acquires an AKA authentication vector and the user terminal information contents based on IP Multimedia Private Identity (abbreviated as IMPI) from a Home Subscriber Server (abbreviated as HSS); the OP uses an AKA authentication method to send an authentication challenge to the UE to make the UE authenticate this network; the UE sends a response according to the challenge to the OP and the authentication of the UE is finished in the OP. The OP sends an assertion declaring that the OpenID identifier belongs to the marker information of this terminal, wherein the assertion is marked up by the OP using a shared key (the key can be a shared key between the OP and the RP and can also be the key of the OP itself) between the OP and the RP; this assertion is redirected to the RP; if the shared key between the OP and the RP is used, then the RP directly verifies the signature information and informs the UE of the verification result; and if the key of the OP itself is used to perform encryption, then the RP transfers the copy of this assertion to the OP to verify the copy, the OP informs the RP of the verification result and finally the RP informs the UE of the verification result.

By this architecture, the network operators can provide the service function of identity verification for the users accessing a WEB server as OpenID providers. For an application storing an ISIM (an identity identification in the IMS), the users can provide cross-IMS and web server and the like to achieve the SSO function thereto. The users are allowed to control their public identity identifiers on the WEB. The information security of the users themselves can be improved by the users accessing the WEB applications controlled by those reliable network operators.

3. The case that there is no UICC in the IMS UE and the operators neither deploy the GBA: with the increasing of non-UICC terminals accessing IMS network, the occurring probability of this case is larger and larger, and in the case that the GBA and the non-UICC are not deployed, the users also need to access the IMS network and use IMS relevant application services. In this case, the non-UICC-based IMS-SSO authentication becomes very necessary. However, how to perform the SSO function under such scenario is still not proposed in the related art.

In summary, in the related art, only those terminals with UICCs can achieve the SSO function and then access various application services in the IMS network, and in most cases it is required that the network operators deploy a large amount of GBAs, which will increase the investment cost of the operators; while those terminals without UICCs will not be able to use the existing architecture solutions to achieve the SSO function to the relevant application services in the IMS network.

SUMMARY OF THE INVENTION

A method and a system for single sign-on are provided by the present invention to at least solve the above problem.

According to one aspect of the present invention, a method for single sign-on is provided, wherein the method comprises: a terminal sending an authentication request carrying a user identity identification to an application server (RP), and the RP redirecting the authentication request to an authentication center; the authentication center authenticating the terminal by means of session initiation protocol digest authentication (SIP Digest) and redirecting an authentication result to the RP via the terminal; and the RP providing services for the terminal according to the authentication result.

Before the authentication center authenticating the terminal by means of SIP Digest, the method further comprises: the authentication center judging whether there is a first shared key $K_0$ between the authentication center and the terminal, and if not, then continuing the following process, otherwise skipping the step of the authentication center authenticating the terminal by means of SIP Digest and directly redirecting the authentication result to the RP.

The method further comprises: the RP further redirecting the authentication request carrying the RP identity identification to the authentication center; and the authentication center authenticating the RP and sending the authentication result to the terminal.

The user identity identification is an open identity identification (OpenID) and the authentication center is an OpenID Provider (OP); or, the user identity identification is an identity identification inputted into the terminal or an identity identification acquired when the terminal registers in an Internet Protocol Multimedia Subsystem (IMS) and the authentication center is a single sign-on authentication center (IdP).

The authentication center authenticating the terminal by means of SIP Digest comprises: the authentication center authenticating the terminal according to an SIP Digest authentication vector corresponding to the terminal.

The authentication center acquires the SIP Digest authentication vector corresponding to the terminal from a Home Subscriber Server (HSS) according to the user identity identification and stores the SIP Digest authentication vector.

The SIP Digest authentication vector at least comprises the following contents of: a user identity identification, an authentication algorithm algorithm, a quality assurance, a scope realm, and a hash value H(A1), wherein the H(A1) is consisted of the user identity identification, the realm and a password password.

The authentication center authenticating the terminal by means of SIP Digest comprises: the authentication center generating a first random number nonce and sending a message carrying the algorithm, the nonce and the realm to the terminal; the terminal generating a second random number cnonce, generating a response value response by the algorithm according to the nonce, the cnonce, and the hash value H(A1) generated by the realm, the user identity identification and the inputted password, and sending a response message to the authentication center, wherein the response message carries the cnonce, the nonce, the realm, the response and the algorithm; and the authentication center calculating a check response value Xresponse according to the stored H(A1), the stored nonce, and the received cnonce by using the algorithm, and comparing the received response with the Xresponse, and if they are the same, then the authentication is successful, otherwise the authentication is failed.

After the step of the authentication center generating the first random number nonce and sending the message carrying the algorithm, the nonce and the realm to the terminal, the method further comprises: the terminal calculating a first shared key $K_0$ between the authentication center and the terminal according to the generated H(A1) and the cnonce; and after the step of the authentication center authenticating the terminal by means of SIP Digest, the method further comprises: the authentication center calculating the $K_0$ according to the stored H(A1) and the cnonce and storing the $K_0$.

In the case that the user identity identification is the identity identification inputted into the terminal or the identity identification acquired when the terminal is registered in the IMS and the authentication center is the IdP and the authentication of the authentication center is successful, the method further comprises: the authentication center generating a third random number nonce1 and generating a second key $K_1$ according to the nonce 1 and the first shared key $K_0$ between the authentication center and the terminal; the authentication center encrypting the nonce1 and an authentication result RP_Auth for the RP by using the $K_0$ to obtain $K_0$(nonce1, RP_Auth), and encrypting the $K_1$ and an authentication result UE_Auth for the terminal by using a shared key Kr,i between the authentication center and the RP to obtain Kr,i($K_1$, UE_Auth); the terminal obtaining the $K_0$(nonce1, RP_Auth) and the Kr,i($K_1$, UE_Auth) and redirecting the Kr,i($K_1$, UE_Auth) to the RP; the terminal decrypting the $K_0$(nonce1, RP_Auth) to obtain the authentication result for the RP and generating the second key $K_1$; and the RP decrypting the Kr,i($K_1$, UE_Auth) and encrypting service contents by using the $K_1$ and sending the service contents to the terminal; and the terminal using the $K_1$ to perform decryption to obtain the service contents.

In the case that the user identity identification is the OpenID, the authentication center is the OP, and the authentication of the authentication center is successful, the method further comprises: the authentication center generating a third random number nonce1 and generating a second key $K_1$ according to the nonce1 and the first shared key $K_0$ between the authentication center and the terminal; the authentication center encrypting the nonce1 and an authentication assertion RP_Assert for the RP by using the $K_0$ to obtain $K_0$(nonce1, RP_Assert), and encrypting the $K_1$ and an authentication assertion UE_Assert for the terminal by using a shared key Kr,i between the authentication center and the RP to obtain Kr,i($K_1$, UE_Assert); the terminal obtaining the $K_0$(nonce1, RP_Assert) and the Kr,i($K_1$, UE_Assert) and redirecting the Kr,i($K_1$, UE_Assert) to the RP; the terminal decrypting the $K_0$(nonce1, RP_Assert) to obtain the authentication assertion for the RP and generating the second key $K_1$; and the RP decrypting the Kr,i($K_1$, UE_Assert) and encrypting service contents by using the $K_1$ and sending the service contents to the terminal; and the terminal using $K_1$ to perform decryption to obtain the service contents.

According to another aspect of the present invention, a system for single sign-on is provided, wherein the system comprises: a terminal, configured to send an authentication request carrying a user identity identification to an application server RP; the RP, configured to redirect the authentication request to an authentication center and provide services for the terminal according to an authentication result of the authentication center; and the authentication center, configured to authenticate the terminal by means of Session Initiation Protocol Digest (SIP Digest) authentication and redirect the authentication result to the RP via the terminal.

In the case that the user identity identification is an open identity identification (OpenID), the authentication center is an OpenID Provider (OP); and in the case that the user identity identification is an identity identification inputted into the terminal or an identity identification acquired when the terminal registers in an Internet Protocol Multimedia Subsystem (IMS), the authentication center is a single sign-on authentication center (IdP).

The authentication center is further configured to generate a secure communication key and redirect the secure communication key to the RP via the terminal; the RP is further configured to encrypt service contents by using the secure communication key and send the service contents to the terminal; and the terminal is further configured to generate the secure communication key and perform decryption to obtain the service contents by using the secure communication key.

According to the present invention, the RP redirects the authentication request of the UE to the authentication center, and the authentication center authenticates this UE according to the received user identity identification by means of SIP Digest and redirects the authentication result to the RP, which solves the problem that the authentication solution in the related art is only suitable to those terminals with UICC cards, and this method is capable of supporting the authentication of those terminals without UICCs to sign on the RP singly. Since by this method a large amount of GBAs do not need to be deployed, the resources required by the operators to deploy the GBAs are reduced, at the same time the requirement of non-UICC terminals accessing the IMS network is met and the non-UICC terminals can access relevant application services of the IMS network by means of SSO.

BRIEF DESCRIPTION OF THE DRAWINGS

The drawings illustrated here provide a further understanding of the present invention and form a part of the present application. The exemplary embodiments and the description thereof are used to explain the present invention without unduly limiting the scope of the present invention.
In the drawings.

DETAILED DESCRIPTION OF EMBODIMENTS

The present invention will be described hereinafter in detail with reference to the drawings and in conjunction with embodiments. It needs to be noted that the embodiments of the present application and the features of the embodiments can be combined with each other if there is no conflict.

Figure 1:
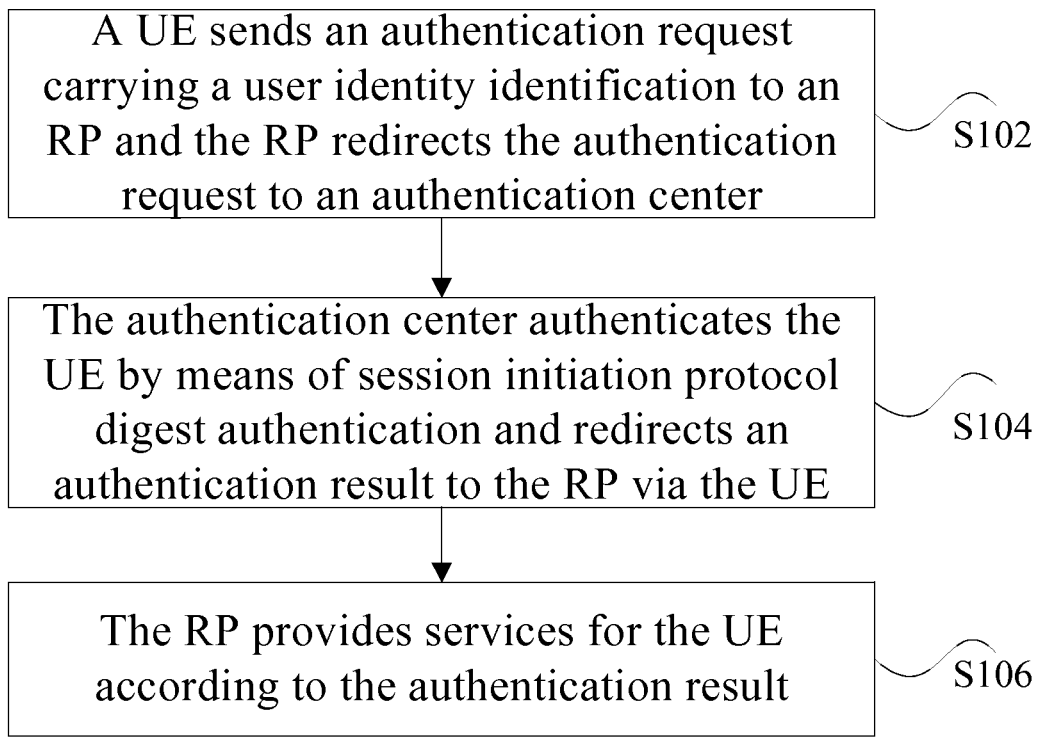
FIG. 1 is a flow chart of a method for single sign-on according to one embodiment of the present invention.

FIG. 1 is a flow chart of a method for single sign-on according to one embodiment of the present invention, wherein the method comprises:

Step S102: A UE sends an authentication request carrying a user identity identification to a RP and the RP redirects the authentication request to an authentication center;

Step S104: The authentication center authenticates the UE by means of Session Initiation Protocol Digest Authentication (abbreviated as SIP Digest) and redirects an authentication result to the RP via the UE; and Step S106: The RP provides services for the UE according to the authentication result.

In the related art, the UE terminal generally achieves the SSO function to an application server by means of the combination of Liberty Alliance and OpenID or the combination of AKA and OpenID, and these two means only support the authentication of UICC identity identification information. Therefore it only suitable to the case that the UE terminal previously owns a UICC; however, in real applications, the UE without a UICC gradually increases, so it needs a new mechanism to support the UE terminal without a UICC to achieve the SSO function. According to and the method of this embodiment, the authentication is performed by means of SIP Digest, and the types of the supported user identity identifications are not limited to UICC identity identification information, so the method can support the authentication of the terminals without UICCs.

By the above method, the network operators can act as user authentication center providers to finish the uniform authentication to the UE terminal using AS to facilitate various application servers to access the terminal. The network operators can provide a large amount of user groups for application service providers, and the operators can better meet the requirements of the user groups to various application services by cooperating with the AS providers, and at the same time the users access relevant application servers via reliable network operators, which not only provides convenience for the user but also improves the security of user information and at the same time the profit mode of the operators is enlarged too.

Preferably, before the authentication center authenticates the UE by means of SIP Digest, the authentication center judges whether there is a first shared key $K_0$ between the authentication center and the UE, and if not, then continue the following process, otherwise skip the step of the authentication center authenticating the UE by means of SIP Digest and directly redirect the authentication result to the RP. By the above judgment steps, the authentication center can directly returns the authentication result to the RP for the already authenticated UE, which improves the processing speed.

In the related art, since the OP authentication center only performs unidirectional authentication to the UE terminal and the non-authentication attack situation may present in the server, there may be the problem that the security is relatively poor due to the illegality of the server. Therefore, in this embodiment, the RP can also redirect the authentication request carrying the RP identity identification to the authentication center; and the authentication center authenticates the RP and sends the authentication result to the UE. By the above method, the UE without a UICC can achieve the SSO function to the legal application servers in the IMS network and the security of the IMS terminal identity information can better be ensured by using bidirectional authentication and those illegal application servers can be identified correctly, which improves service security.

Preferably, the above user identity identification can be an open identity identification (OpenID) and the authentication center can be an OP; or, the user identity identification can be an identity identification inputted into the UE or an identity identification acquired when the UE registers in an Internet protocol multimedia subsystem (IMS) and the authentication center can be a single sign-on authentication center (IdP).

During the particular implementation, the process of the authentication center authenticating the UE by means of SIP Digest can use the following process means: the authentication center authenticating the terminal according to an SIP Digest authentication vector (SD-AV) corresponding to this terminal. This (SD-AV) can be acquired from the HSS according to the user identity identification and stored by the authentication center, wherein the SD-AV at least comprises the following contents: a user identity identification, an authentication algorithm algorithm, a quality assurance, a scope realm and a hash value $H(A1)$, wherein $H(A1)$ is consisted of the user identity identification, realm and a password password.

Preferably, according to the above parameters, the process of the authentication center authenticating the terminal by means of SIP Digest can comprises: the authentication center generating a first random number nonce and sending a message carrying algorithm, nonce, realm, etc. to the UE; the UE generating a second random number cnonce, generating a response value response by using algorithm according to nonce, cnonce and $H(A1)$ generated by realm, the user identity identification and password inputted by a user, and returning a response message to the authentication center, wherein the response message carries cnonce, nonce, realm, response and algorithm; and the authentication center calculating a check response value Xresponse by using algorithm according to the stored $H(A1)$, the stored nonce, and the received cnonce and comparing the received response and the Xresponse, if they are the same, then the authentication is successful, otherwise the authentication is failed. By using the SIP Digest authentication mechanism, the operators can better achieve the SSO function in the scenario 3 by providing an IdP uniform authentication center to perform uniform bidirectional authentication to the user and the accessed application server.

Preferably, the calculation basis of response can also comprise: the use times of the UE using the same nonce when the UE calculates response. The possibility of replay attack can be reduced by also using nonce-count to join the calculation of response.

By the above process, after the authentication center generates a first random number nonce and sends a message carrying algorithm, nonce and realm to the terminal, the UE can calculate $K_0$ using an authentication algorithm according to H(A1) and cnonce; and after the authentication center authenticates the UE by means of SIP Digest, the authentication center can calculate $K_0$ according to the authentication algorithm and store it. By the above method, the authentication center and the UE can generate the shared key $K_0$ between them according to the interaction parameters during the authentication process, and the authentication center can judge whether this UE has been authenticated according to whether the authentication center stores this shared key.

After the authentication of the authentication center to the UE is successful, in order to ensure the communication security between the UE and the RP, the following processing mode can be used.

(1) In the case that the user identity identification is the identity identification inputted into the UE or the identity identification acquired when the UE registers in the IMS, the authentication center is the IdP and the authentication of the authentication center is successful, the authentication center generates a third random number nonce1 and generates a second key $K_1$ according nonce1 and $K_0$; the authentication center uses $K_0$ to encrypt nonce1 and the authentication result RP_Auth for the RP to obtain $K_0$(nonce1, RP_Auth) and uses the shared key Kr,i between the authentication center and the RP to encrypt $K_1$ and the authentication result UE_Auth for the UE to obtain Kr,i($K_1$, UE_Auth); the terminal obtains $K_0$(nonce1, RP_Auth) and Kr,i($K_1$, UE_Auth) and redirects Kr,i($K_1$, UE_Auth) to the RP; the UE decrypts $K_0$(nonce1, RP_Auth) to obtain the authentication result to the RP and generate the second key $K_1$; the RP decrypts Kr,i($K_1$, UE_Auth), encrypts the service contents by using $K_1$ and sends the service contents to the UE; and the UE uses $K_1$ to perform decryption to obtain the service contents.

(2) In the case that the user identity identification is the OpenID, the authentication center is the OP and the authentication of the authentication center is successful, the authentication center generates a third random number nonce1 and generates a second key $K_1$ according nonce1 and $K_0$; the authentication center uses $K_0$ to encrypt nonce1 and the authentication assertion RP_Assert for the RP to obtain $K_0$(nonce1, RP_Assert) and uses the shared key Kr,i between the authentication center and the RP to encrypt $K_1$ and the authentication assertion UE_Assert for the UE to obtain Kr,i ($K_1$, UE_Assert); the terminal obtains $K_0$(nonce1, RP_Assert) and Kr,i($K_1$, UE_Assert), and redirects Kr,i($K_1$, UE_Assert) to the RP; the UE decrypts $K_0$(nonce1, RP_Assert) to obtain the authentication assertion for the RP and generates the second key $K_1$; the RP decrypts Kr,i($K_1$, UE_Assert) and encrypts the service contents by using $K_1$ and sends the service contents to the UE; and the UE uses $K_1$ to perform decryption to obtain the service contents.

In the above method, the interaction information between the authentication center and the UE and the interaction information between the authentication center and the RP both use the shared keys corresponding to themselves to perform encryption, which ensures the information interaction security between the authentication center and the UE as well as between the authentication center and the RP. Additionally, a $K_1$ is generated for once authentication request of the UE so that the UE and the RP uses $K_1$ to encrypt the interacted service contents to prevent the user data being intercepted illegally, which further improves the security.

It needs to be noted that the above method uses the SIP Digest mechanism, which not only is suitable to the authentication of the terminal without a UICC but also is suitable to the authentication of UICC terminals, and it does not need to configure a large amount of GBAs, which reduces the cost of the network operators to deploy GBAs and embed UICC cards.

Figure 2:
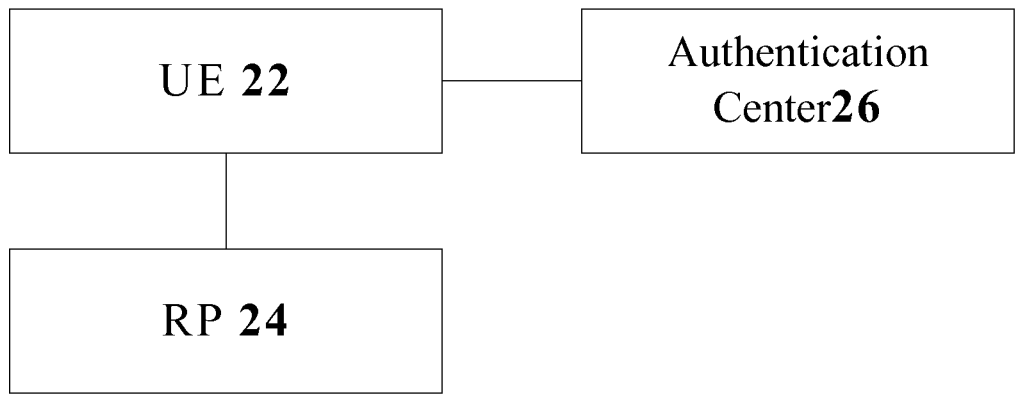
FIG. 2 is a structural block diagram of a system for single sign-on according to one embodiment of the present invention.

A system for single sign-on is further provided by the embodiments, and FIG. 2 is a structural block diagram of a system for single sign-on according to one embodiment of the present invention, wherein the system comprises: UE 22, configured to send an authentication request carrying a user identity identification to an RP 24; the RP 24, configured to redirect the authentication request to an authentication center 26 and configured to provide services for the UE 22 according to the authentication result of the authentication center 26; the authentication center 26, configured to authenticate the UE 22 by means of SIP Digest and redirect the authentication result to the RP 24 via the UE 22.

Preferably, in the case that the user identity identification is an OpenID, the authentication center 26 is an OP; and in the case that the user identity identification is an identity identification inputted into the UE or an identity identification acquired when the UE registers in the IMS, the authentication center 26 is an IdP.

Preferably, the authentication center 26 is further configured to generate a security communication key and redirects this security communication key to the RP 24 via the UE 22; the RP 24 is further configured to use this security communication key to encrypt service contents and send the service contents to the UE 22; and the UE 22 is further configured to generate this security communication key and uses this security communication key to perform decryption to obtain the service contents.

Embodiments I to III will be described below, which combine the technical solutions of the above several preferred embodiments.

Embodiment I

The present embodiment provides a method for achieving the SSO function to an application server in a uniform IMS network based on SIP Digest authentication mechanism. In this method, the bidirectional authentication mechanism is performed to the UE terminal and the AS server, which can meet the UE terminal without a UICC to achieve the SSO function to the application server thereof in the IMS network. Compared with the OpenID/AKA, the method has better universality and security, which ensures the security of both the UE user terminal and the AS server. This method mainly comprises the steps as follows.

Step 1: A UE terminal user registers in the IMS network.

Step 2: When this terminal wants to access an application server RP, the RP itself does not store any identity information of the UE and the RP does not authenticate the UE but directly redirects this sign-on authentication request to an IdP (SSO) single sign-on authentication center (or OP) provided by a network operator to have this UE terminal authenticated; and at the same time the RP application server shall also be authenticated in the IdP authentication center for the security of the UE user terminal. The RP and the IdP have already negotiated to share the key.

Step 3: The IdP authenticates the RP identity and stores the authentication result.

Step 4: The IdP searches whether the IdP contains a unique shared key $K_0$ corresponding to this UE user terminal information. If this unique shared key $K_0$ is present, then it indicates that this UE terminal has passed the authentication, the SIP Digest authentication process does not need to be performed and a session key $K_1$ is directly generated by using this shared key $K_0$ and a random number nonce newly generated by the IdP, and the keys $K_0$ and $K_1$ are used to achieve the following RP authentication and UE verification process. If the user $K_0$ is not present, then an authentication vector and user information relevant to this user will be downloaded from a HSS according to the transferred user identifier. Then the authentication process to the UE terminal is achieved by using these parameters and by means of SIP Digest authentication. After the UE terminal has been authenticated, a session key $K_1$ is generated by using the shared key $K_0$ generated by H(A1), cnonce, nonce-count, etc. and the random number nonce1 newly generated by the IdP, and then the following RP authentication and UE verification process are achieved by using the keys $K_0$ and $K_1$.

The processing of the single sign-on of those IMS terminals without UICCs in a network architecture without deploying GBAs will be described in detail in Embodiments II and III in conjunction with FIGS. 1 and 2 hereinafter. It needs to be noted that there are whole flow charts in the figures, the UE is IMS non-UICC card terminal, the RP is corresponding to an application server to be accessed by the IMS terminal, and the IdP/OP is corresponding to an SSO subsystem provided by the network operator. For the conciseness of the procedure, particular network element interfaces of some networks which have no effect to the procedure are not shown and the supporting protocols are not described, for example, the function of the interface between the UE and the RP, the function of the interface between the UE and an IdP, the function of the interface between the HSS and the IdP, and the supporting relevant protocol and the like are all not shown; it is not indicated in the figures that the interface reference point between the HSS and the IdP is capable of achieving Diameter protocol, and the conditions such as the UE and the IdP both needing to support SIP Digest authentication mechanism, etc. are also not indicated in the figures; and for the conciseness, these particular interface reference points are not shown in the figures. The authentication of the IdP to the RP has been achieved successfully by a mature mechanism, while the UE and the IdP achieving the negotiation mechanism of a shared key can also be achieved successfully, which will not be described herein redundantly.

Embodiment II

Figure 3:
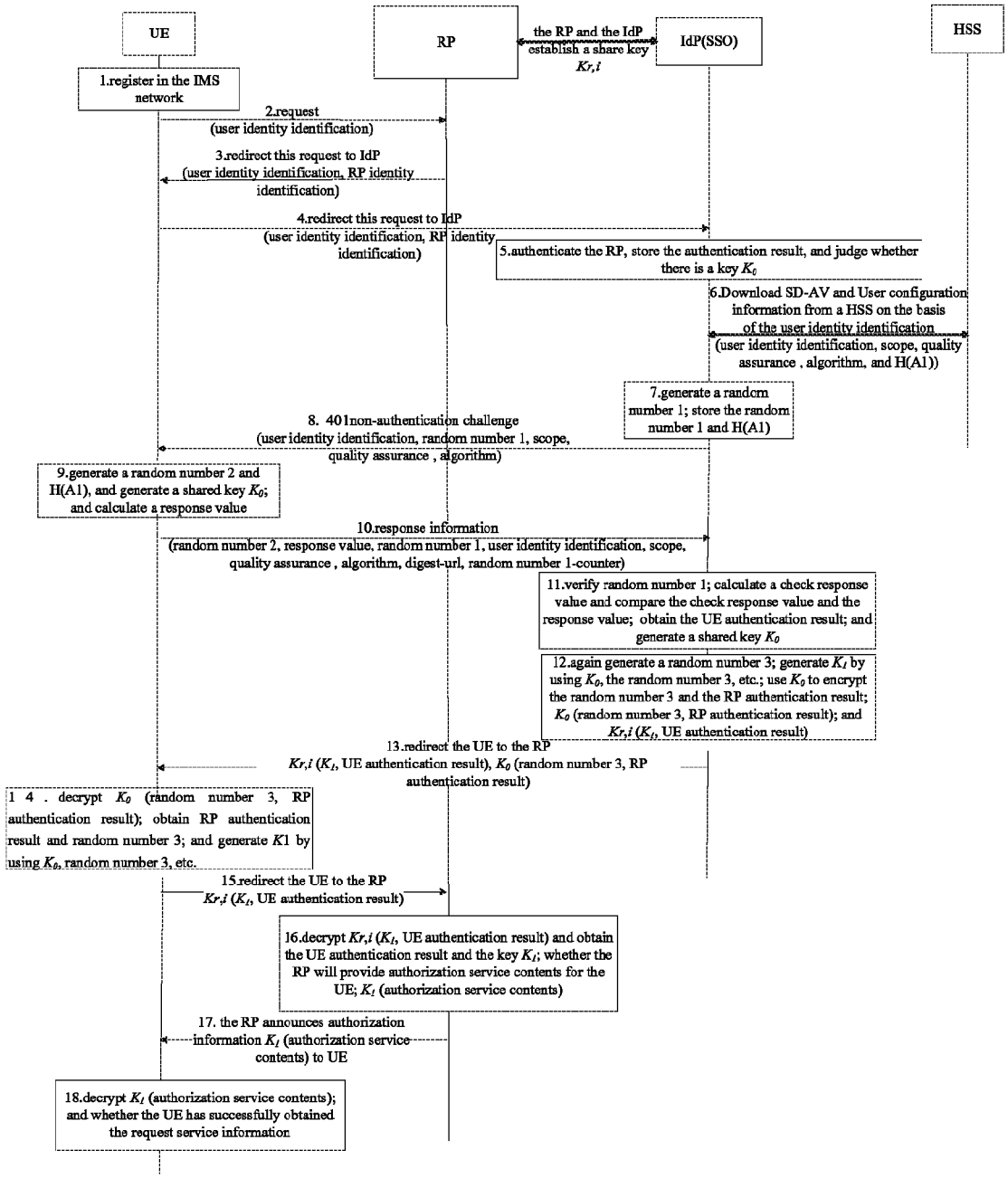
FIG. 3 is a flow chart of an IMS terminal without a UICC achieving a single sign-on authentication procedure to an application server by using a SIP Digest authentication mechanism according to Embodiment II.

FIG. 3 is a flow chart of an IMS terminal without a UICC achieving a single sign-on authentication procedure to an application server by using a SIP Digest authentication mechanism according to Embodiment II, and the detailed description of the procedure is as follows.

Step 1: A UE terminal first finishes the registration in an IMS network. This process can be achieved by using the SIP Digest terminal user registration mechanism in TS33.203 document.

Step 2: The UE sends an authentication request to a RP, wherein the request carries a user identity identification (U_credentials) of a user.

Step 3: The RP redirects this user authentication request to an IdP address and sends an RP authentication request to the IdP address, wherein the RP authentication request carries the user identity identification (U_credentials) and an RP identity identification information (RP_credentials) respectively.

Step 4: The above authentication request is redirected to the IdP address, wherein the request carries the user identity identification (U_credentials) and the RP identity identification information (RP_credentials) respectively.

Step 5: The IdP authenticated the RP according to the RP identity identification information (RP_credentials) and stores the authentication result RP_Auth for the RP; and at the same time the IdP judges whether there is a shared key $K_0$ between the UE and the IdP corresponding to the IdP in the IdP according to the transferred user identity identification (U_credentials). If this shared key is present, then directly skip to step 12 to perform, otherwise continue to perform the next step. The RP and the IdP of a network operator (SSO) have previously established a shared key (Kr,i).

Step 6: The IdP searches and downloads a corresponding SIP Digest authentication vector (abbreviated as SD-AV) and user configuration information contents in a HSS according to the user identity identification received in the previous step. The SIP Digest authentication vector comprises U_credentials, a scope (realm), a quality assurance (qop), an algorithm (algorithm) and H(A1), wherein H(A1) is a hash function value consisted of U_credentials, realm, and a password (password). In the multi-HSS environment, the IdP can obtain the corresponding HSS address where the user information is stored by querying an SLF and finds this HSS corresponding to the HSS address.

Step 7: The IdP generates a random number nonce (indicated as random number 1 in the figure) containing timestamp information and stores H(A1) downloaded from the HSS and this nonce together.

Step 8: The IdP sends a 401 non-authentication challenge message (401 Auth_Challenge) to the UE, wherein the message comprises U_credentials, realm, qop, algorithm, and nonce.

Step 9: The UE generates a random number cnonce (indicated as random number 2 in the figure). H(A1) is generated by using U_credentials, realm, and password; and the shared key $K_0$ between the UE and the IdP is generated by using H(A1), cnonce, nonce-count, the period of validity of the key and the like. A response value (response) is generated by a unidirectional hash function F, wherein response=F(cnonce, nonce, realm, password, U_credentials, qop, nonce-count). The terminal uses cnonce to perform network authentication and avoid plaintext attack ("chosen plaintext"). Nonce-count (also referred to as nonce-counter) is a counter, when the user calculates response once by using the same nonce, nonce-count will increase, and nonce-count is used to join the calculation of response to reduce the possibility of replay attack.

Step 10: The UE sends a response message to the IdP as to the challenge message in the step 8, wherein the response message comprises cnonce, nonce, response, realm, U_credentials, qop, algorithm, Digest-url (digest-url), and nonce-count.

Step 11: The stored value of nonce is used to check the value of nonce in the response message. If the check is right, then the IdP uses the received relevant parameters cnonce, nonce-count, qop, etc. and the originally stored nonce and H(A1) to calculate a check response value (Xresponse) and compares the calculated Xresponse with the received response value, and if the comparison result of both is the same, then the authentication of the user is passed, otherwise the UE user terminal authentication is failed and the IdP generates the authentication result UE_Auth of the UE; and the shared key $K_0$ of the UE and the IdP is generated by using H(A1), cnonce, nonce-count, the period of validity of the key, etc.

Step 12: The IdP generates a random number nonce1 (indicated as random number 3 in the figure) again; the IdP uses $K_0$, nonce1, the period of validity of the key, parameters stored in the IdP, etc. to generate key $K_1$; the IdP uses the shared key $K_0$ to perform encryption operation to nonce1 and RP_Auth to generate $K_0$(nonce1, RP_Auth); and the IdP uses the shared key $K_1$ between the RP and the IdP to encrypt $K_1$ and UE_Auth to generate Kr,i($K_1$, UE_Auth).

Step 13: The IdP redirects the UE terminal to the RP, wherein the message carries $K_0$(nonce1, RP_Auth) and Kr,i($K_1$, UE_Auth).

Step 14: The UE terminal decrypts $K_0$(nonce1, RP_Auth) to obtain the value of nonce1 and the RP authentication result, and obtain the legality of the RP application server. If the RP application server is a legal application server, then sequentially perform the next step, otherwise directly return an announcement message that the server is illegal to the UE terminal; and at the same time use $K_0$, nonce1, the period of validity of the key, the parameters corresponding to the IdP stored in the UE, etc. to generate a key $K_1$.

Step 15: The IdP redirects the UE terminal to the RP, wherein the message carries Kr,i($K_1$, UE_Auth).

Step 16: The RP uses the shared key to decrypt Kr,i($K_1$, UE_Auth) after having received this message and the RP obtains the authentication result of the IdP to the UE terminal and the key $K_1$; the RP judges whether to provide authorized service contents UE_Author for this UE according to UE_Auth; and uses the key $K_1$ to encrypt this authorized information to generate $K_1$(UE_Author).

Step 17: The RP informs the UE of the authorized information contents, which carry the message $K_1$(UE_Author).

Step 18: The UE meets whether it can obtain the required service according to whether the key $K_1$ is able to decrypt $K_1$(UE_Author).

If any of the above steps 1 to 18 is failed, the whole authentication process stops.

If this IMS terminal UE again requests other application servers after having obtained the required service and when the UE authentication request of this IMS terminal user carries the user identity identification (U_credentials) information, the IdP knows whether the authentication of this user has been passed by searching the key $K_0$ corresponding to this user identity identification (U_credentials), and if this key $K_0$ is present, then the user does not need to perform SIP Digest authentication and only needs to start the process from step 12; otherwise the user needs to perform the whole authentication process. When the lifecycle of the key $K_0$ is expired, then it is destroyed automatically, and the authentication user needs to again perform SIP Digest authentication to generate the shared key between the UE and the IdP.

Embodiment III

Figure 4:
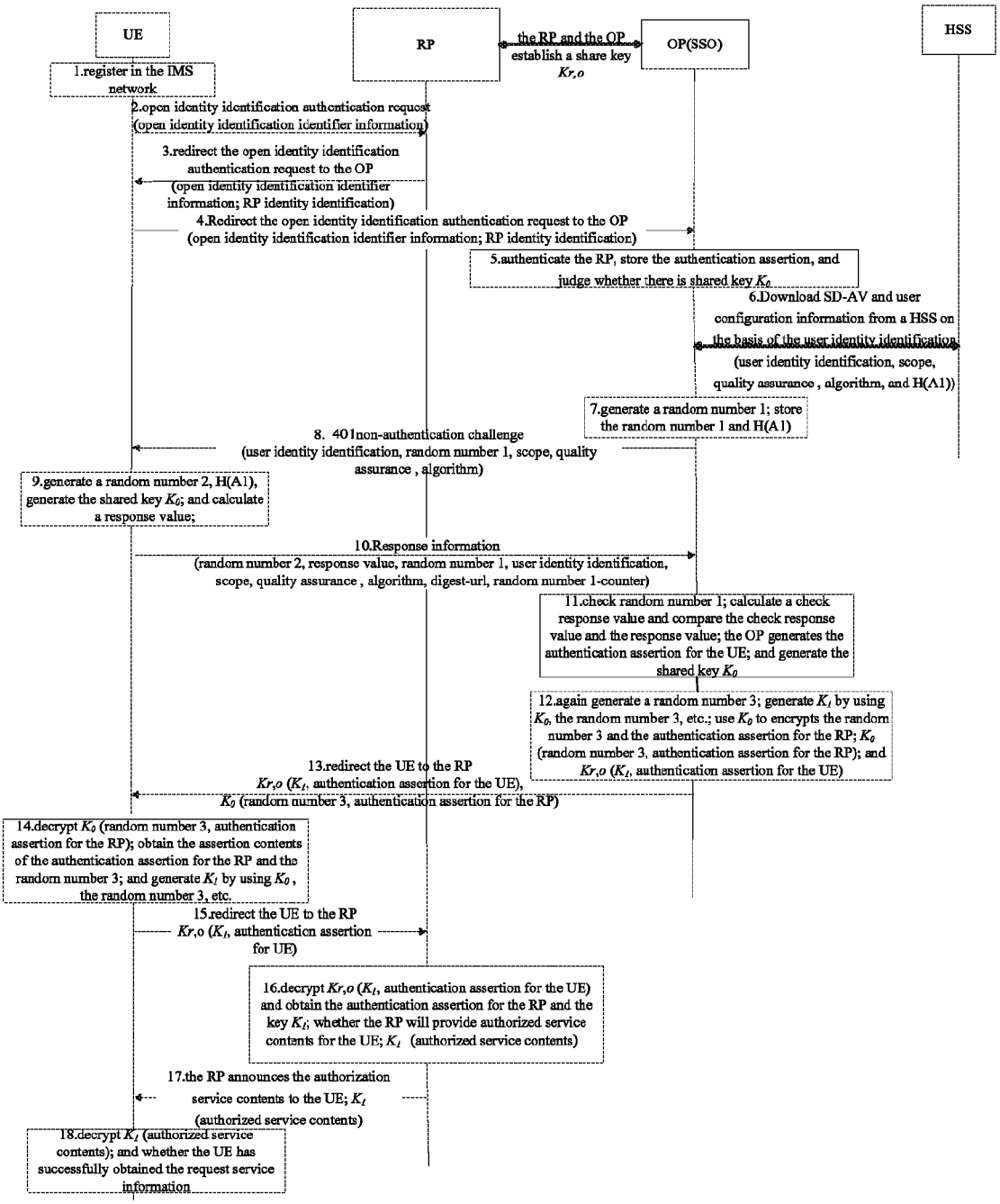
FIG. 4 is a flow chart of an IMS terminal without a UICC achieving a single sign-on authentication procedure to an application server by using a SIP Digest authentication mechanism and achieving interconnection with an existing non 3GPP single sign-on system according to Embodiment III.

FIG. 4 is a flow chart of an IMS terminal without a UICC achieving a single sign-on authentication procedure to an application server by using a SIP Digest authentication mechanism and achieving interconnection with an existing non-3GPP single sign-on system according to Embodiment III, the process of which will be described in detail as follows.

Step 1: A UE terminal firstly finishes the registration in an IMS network. This process can be achieved by using the SIP Digest terminal user registration mechanism in TS33.203 document.

Step 2: The UE sends an authentication request to an RP, wherein the request carries an OpenID identifier information of a user.

Step 3: The RP redirects this user OpenID authentication request and sends an RP authentication request to an OP address. At the same time the user OpenID identifier information OpenID identifier and an RP identity identification information (RP_credentials) are carried.

Step 4: The OpenID authentication request is redirected to the OP address. At the same time the request carries the user OpenID identifier information OpenID identifier and the RP identity identification information (RP_credentials).

Step 5: The OP authenticates the RP according to the RP identity identification information (RP_credentials) and stores the authentication assertion RP_Assert for the RP; and at the same time the OP judges whether there is a shared key $K_0$ between the UE and the IdP corresponding to the OP in the OP according to the transferred user OpenID identifier information OpenID identifier. If this shared key is present, then directly skip to step 12 to perform, otherwise continue to perform the next step. The RP (Application Server) and the network operator OP (SSO) have previously established a shared key (Kr,o). After this step, the OP establishes a mutual relation between OpenID identifier and the user identity identifier.

Step 6: The OP searches and downloads a corresponding SIP Digest Authentication Vector (SD-AV) and user configuration information contents in a HSS according to the mutual relation between OpenID identifier and the user identity identifier in the previous step. The SIP Digest Authentication Vector (SD-AV) comprises U_credentials, realm, qop, algorithm and H(A1), wherein H(A1) is a hash function value consisted of U_credentials, realm, and password. In the multi-HSS environment, the OP can obtain the corresponding HSS address where the user information is stored by querying an SLF and finds this HSS corresponding to the HSS address.

Step 7: The OP generates a random number nonce (indicated as random number 1 in the figure) containing timestamp information and stores H(A1) downloaded from the HSS and this nonce together.

Step 8: The OP sends a 401 non-authentication challenge message to the UE, wherein the message comprises U_credentials, realm, qop, algorithm, and nonce.

Step 9: The UE generates a random number cnonce (indicated as random number 2 in the figure). H(A1) is generated by using U_credentials, realm, and password; and the shared key $K_0$ between the UE and the OP is generated by using H(A1), cnonce, nonce-count, and the period of validity of the key and the like. The value of response is calculated by a unidirectional hash function F, wherein response=F(cnonce, nonce, realm, password, U_credentials, qop, nonce-count). The terminal uses cnonce to perform network authentication and avoid "chosen plaintext" attack. Nonce-count is a counter, when the user calculates response once using the same nonce, the nonce-count will increase, and the nonce-count is used to join the calculation of response to reduce the possibility of replay attack.

Step 10: The UE sends a response to the OP as to the challenge message in the step 8, wherein the response message comprises cnonce, nonce, response, realm, U_credentials, qop, algorithm, Digest-url, and nonce-count.

Step 11: The stored value of nonce is used to check the value of nonce in the response message. If the check is right, then the OP uses the received relevant parameters cnonce, nonce-count, qop, etc. and the originally stored nonce and H(A1) to calculate Xresponse and compares the calculated Xresponse with the received response value, and if the comparison result of both is the same, then the authentication of the user is passed, otherwise the UE user terminal authentication is failed; the OP generates the authentication assertion information UE_Assert for the UE; and the shared key $K_0$ between the UE and the OP is generated by using H(A1), cnonce, nonce-count, the period of validity of the key, etc.

Step 12: The OP generates a random number nonce1 (indicated as random number 3 in the figure) again; the OP uses $K_0$, nonce1, the period of validity of the key, parameters stored in the OP, etc. to generate key $K_1$; the OP uses the shared key $K_0$ to perform encryption operation to nonce1 and the authentication assertion RP_Assert for the RP to generate $K_0$(nonce1, RP_Assert); and the OP uses the shared key between the RP and the OP to encrypt $K_1$ and UE_Assert to generate Kr,o($K_1$, UE_Assert).

Step 13: The OP redirects the UE terminal to the RP, wherein the message carries $K_0$(nonce1, RP_Assert) and Kr,o ($K_1$, UE_Assert).

Step 14: The UE terminal decrypts $K_0$(nonce1, RP_Assert) to obtain the value of nonce1 and the RP authentication assertion and obtain the legality of the RP application server. If the RP application server is a legal application server, then sequentially perform the next step, otherwise directly return an announcement message that the server is illegal to the UE terminal; and at the same time the UE terminal uses $K_0$, nonce1, the period of validity of the key, parameters corresponding to the OP stored in the UE, etc. to generate a key $K_1$.

Step 15: The OP redirects the UE terminal to the RP, wherein the message carries Kr,o($K_1$, UE_Assert).

Step 16: The RP uses the shared key to decrypt Kr,o($K_1$, UE_Assert) after having received this message and the RP obtains the assertion result of the OP for the UE terminal and the key $K_1$; the RP judges whether to provide authorized service contents UE_Author to this UE according to UE_Assert assertion; and uses the key $K_1$ to encrypt this authorized information to generate $K_1$(UE_Author).

Step 17: The RP informs the UE of the authorized information contents, which carry the message $K_1$(UE_Author).

Step 18: The UE meets whether it can obtain the required service according to whether the key $K_1$ is able to decrypt $K_1$(UE_Author).

If any of the above steps 1 to 18 is failed, the whole authentication process stops.

If this IMS terminal UE again requests other application servers after having obtained the required service and when the UE authentication request of this IMS terminal user carries user OpenID identifier information OpenID identifier, the OP knows whether the authentication of this user has been passed by searching the key $K_0$ corresponding to this user OpenID identifier information OpenID identifier, and if this key $K_0$ is present, then the user does not need to perform SIP Digest authentication and only needs to start the process from step 12; otherwise the user needs to perform the whole authentication process. When the lifecycle of the key $K_0$ is expired, then it is destroyed automatically, and the authentication user needs to again perform SIP Digest authentication to generate the shared key between the UE and the OP.

When the UE user is accessing the RP application server, if the UE user encounters accidental network-breaking and the UE still does not finish the UE authentication process, then if the UE wants to access the application server after the network is recovered, the authentication process needs to be restarted; and when the UE has finished the authentication process and the lifecycle of $K_0$ is not reached when the network is recovered, then the UE can continue to use this $K_0$ to perform the following operations after the network is recovered, otherwise it needs re-authentication. After the UE user accesses the RP application server, if such special situations as the user actively shutting off and cancelling the UE or there is a blackout, etc. occur, then the user needs to refinish the whole perform process such as registering in the IMS, etc.

In summary, the solution provided by the embodiments of the present invention is capable of supporting the authentication to those terminals without UICCs signing on the RP singly. Since according to this method a large amount of GBAs do not need to be deployed and the non-UICC terminals accessing the IMS network can be met, the cost of the network operators for deploying GBAs and embedding UICCs is reduced, the consumption for maintaining various devices is reduced, and relevant application services of the IMS network can be accessed by means of SSO.

It needs to be noted that the steps shown in the flow charts of the drawings can be executed in a computer system such as a set of computer executable instructions, and although the logical orders are shown in the flow charts, the steps shown or described herein can be executed in an order different from these in some cases.

Apparently, those skilled in the art should understand that each module or step in the above present invention can be implemented through general-purpose computing devices and they can be integrated in a single computing device or distributed on a network which consists of a plurality of computing devices. Optionally, the modules and the steps of the present invention can be implemented by using executable program code of the calculating device. Consequently, they can be stored in the storing device and can be executed by the calculating device, or they can be made into each integrated circuit module respectively or they can be implemented by making a plurality of modules or steps of them into single integrated module. In this way, the present invention is not limited to the combination of any specific hardware and software.

Above descriptions are only preferred embodiments of the present invention, which are not used to limit the present invention. Various alterations and changes to the present invention are apparent to those skilled in the art. Any amendments, equivalent substitutions, improvements etc. within the spirit and principle of the present invention are all included in the scope of the claims of the present invention.

What is claimed is:

1. A method for single sign-on, comprising:
a terminal sending an authentication request carrying a user identity identification to an application server (RP), and the RP redirecting the authentication request to an authentication center;
the authentication center authenticating the terminal by means of session initiation protocol digest authentication (SIP Digest) and redirecting an authentication result to the RP via the terminal; and
the RP providing services for the terminal according to the authentication result;
wherein the user identity identification is an open identity identification (OpenID) and the authentication center is an OpenID Provider (OP); or, the user identity identification is an identity identification inputted into the terminal or an identity identification acquired when the terminal registers in an Internet Protocol Multimedia Subsystem (IMS) and the authentication center is a single sign-on authentication center (IdP);
wherein, in the case that the user identity identification is the identity identification inputted into the terminal or the identity identification acquired when the terminal is registered in the IMS and the authentication center is the IdP and the authentication of the authentication center is successful, the method further comprises:
the authentication center generating a third random number nonce1 and generating a second key $K_1$ according to the nonce1 and the first shared key $K_0$ between the authentication center and the terminal;
the authentication center encrypting the nonce1 and an authentication result RP_Auth for the RP by using the $K_0$ to obtain $K_0$(nonce1, RP_Auth), and encrypting the $K_1$ and an authentication result UE_Auth for the terminal by using a shared key Kr,i between the authentication center and the RP to obtain Kr,i($K_1$, UE_Auth);

the terminal obtaining the $K_0$(nonce1,RP_Auth) and the Kr,i($K_1$,UE_Auth) and redirecting the Kr,i($K_1$,UE_Auth) to the RP;

the terminal decrypting the $K_0$(nonce1,RP_Auth) to obtain the authentication result for the RP and generating the second key $K_1$; and the RP decrypting the Kr,i($K_1$,UE_Auth) and encrypting service contents by using the $K_1$ and sending the service contents to the terminal; and the terminal using the $K_1$ to perform decryption to obtain the service contents; and wherein, in the case that the user identity identification is the Open ID, the authentication center is the OP, and the authentication of the authentication center is successful, the method further comprises:

the authentication center generating a third random number nonce1 and generating a second key $K_1$ according to the nonce1 and the first shared key $K_0$ between the authentication center and the terminal;

the authentication center encrypting the nonce1 and an authentication assertion RP_Assert for the RP by using the $K_0$ to obtain $K_0$(nonce1,RP_Assert), and encrypting the $K_1$ and an authentication assertion UE_Assert for the terminal by using a shared key Kr,i between the authentication center and the RP to obtain Kr,i($K_1$,UE_Assert);

the terminal obtaining the $K_0$(nonce1,RP_Assert) and the Kr,i($K_1$,UE_Assert) and redirecting the Kr,i($K_1$,UE_Assert) to the RP;

the terminal decrypting the $K_0$(nonce1,RP_Assert) to obtain the authentication assertion for the RP and generating the second key $K_1$; and the RP decrypting the Kr,i($K_1$,UE_Assert) and encrypting service contents by using the $K_1$ and sending the service contents to the terminal; and the terminal using $K_1$ to perform decryption to obtain the service contents.

2. The method according to claim 1, wherein before the authentication center authenticating the terminal by means of SIP Digest, the method further comprises:

the authentication center judging whether there is a first shared key $K_0$ between the authentication center and the terminal, and if not, then continuing the following process, otherwise skipping the step of the authentication center authenticating the terminal by means of SIP Digest and directly redirecting the authentication result to the RP.

3. The method according to claim 1, wherein the method further comprises:

the RP further redirecting an authentication request carrying an RP identity identification to the authentication center; and the authentication center authenticating the RP and sending the authentication result to the terminal.

4. The method according to claim 1, wherein the authentication center authenticating the terminal by means of SIP Digest comprises:

the authentication center authenticating the terminal according to an SIP Digest authentication vector corresponding to the terminal.

5. The method according to claim 4, wherein the authentication center acquires the SIP Digest authentication vector corresponding to the terminal from a Home Subscriber Server (HSS) according to the user identity identification and stores the SIP Digest authentication vector.

6. The method according to claim 5, wherein the SIP Digest authentication vector at least comprises the following contents of: a user identity identification, an authentication algorithm, a quality assurance, a scope realm, and a hash value H(A1), wherein the H(A1) is consisted of the user identity identification, the realm and a password.

7. The method according to claim 6, wherein the authentication center authenticating the terminal by means of SIP Digest comprises:

the authentication center generating a first random number nonce and sending a message carrying the algorithm, the nonce and the realm to the terminal;

the terminal generating a second random number cnonce, generating a response value response by the algorithm according to the nonce, the cnonce, and the hash value H(A1) generated by the realm, the user identity identification and the inputted password, and sending a response message to the authentication center, wherein the response message carries the cnonce, the nonce, the realm, the response and the algorithm; and the authentication center calculating a check response value Xresponse according to the stored H(A1), the stored nonce, and the received cnonce by using the algorithm, and comparing the received response with the Xresponse, and if they are the same, then the authentication is successful, otherwise the authentication is failed.

8. The method according to claim 7, wherein, after the step of the authentication center generating the first random number nonce and sending the message carrying the algorithm, the nonce and the realm to the terminal, the method further comprises: the terminal calculating a first shared key $K_0$ between the authentication center and the terminal according to the generated H(A1) and the cnonce; and after the step of the authentication center authenticating the terminal by means of SIP Digest, the method further comprises: the authentication center calculating the $K_0$ according to the stored H(A1) and the cnonce and storing the $K_0$.

9. A system for single sign-on, comprising:

a terminal, configured to send an authentication request carrying a user identity identification to an application server RP;

the RP, configured to redirect the authentication request to an authentication center and provide services for the terminal according to an authentication result of the authentication center; and the authentication center, configured to authenticate the terminal by means of Session Initiation Protocol Digest (SIP Digest)authentication and redirect the authentication result to the RP via the terminal;

wherein the authentication center is further configured to generate a secure communication key and redirect the secure communication key to the RP via the terminal; the RP is further configured to encrypt service contents by using the secure communication key and send the service contents to the terminal; and the terminal is further configured to generate the secure communication key and perform decryption to obtain the service contents by using the secure communication key.

10. The system according to claim 9, wherein in the case that the user identity identification is an open identity identification (OpenID), the authentication center is an OpenID Provider (OP); and in the case that the user identity identification is an identity identification inputted into the terminal or an identity identification acquired when the terminal registers in an Internet Protocol Multimedia Subsystem (IMS), the authentication center is a single sign-on authentication center (IdP).

* * * * *